United States Patent [19]

Saito

[11] Patent Number: 4,823,002
[45] Date of Patent: Apr. 18, 1989

[54] DEFLECTION SCANNING OPTICAL SYSTEM WITH REFLECTING SECTIONS

[75] Inventor: Taizo Saito, Tokyo, Japan

[73] Assignee: Asahi Kogaku Kogyo K.K., Tokyo, Japan

[21] Appl. No.: 177,398

[22] Filed: Apr. 4, 1988

[30] Foreign Application Priority Data

Apr. 6, 1987 [JP] Japan .................................. 62-84055

[51] Int. Cl.$^4$ .......................... H01J 3/14; G02B 26/08
[52] U.S. Cl. ..................................... 250/235; 250/236; 350/6.8; 346/108
[58] Field of Search ................... 350/6.6, 6.5, 6.7, 6.8; 250/236, 235; 346/108, 109; 358/293, 294, 296

[56] References Cited

U.S. PATENT DOCUMENTS

| | | | |
|---|---|---|---|
| 3,970,359 | 7/1976 | Starkweather | 350/6.8 |
| 4,130,339 | 12/1978 | Kawamura et al. | 350/6.8 |
| 4,612,555 | 9/1986 | Hongou et al. | 346/108 |
| 4,613,877 | 9/1986 | Spencer et al. | 346/108 |
| 4,704,698 | 11/1987 | Reiniger | 346/108 |
| 4,762,994 | 8/1988 | Byerly et al. | 250/236 |

Primary Examiner—David C. Nelms
Assistant Examiner—Michael Messinger
Attorney, Agent, or Firm—Sandler & Greenblum

[57] ABSTRACT

In a deflection scanning optical system, a single first mirror is arranged between a laser beam source and a surface to be scanned. The first mirror has a first reflecting section, a second reflecting section and a transparent section. The laser beam from the laser beam source is reflected by the first reflecting section. A second mirror is provided for reflecting the laser beam reflected by the first reflecting section, toward the second reflecting section. The second mirror also reflects the laser beam reflected by the first reflecting section to transmit the reflected laser beam through the transparent section, thereby directing the transmitted laser beam toward the surface to be scanned. A detector received the laser beam reflected by the second mirror toward the second reflecting section and reflected by the same, for detecting a scanning position of the laser beam with respect to the surface to be scanned.

9 Claims, 2 Drawing Sheets

DEFLECTION SCANNING OPTICAL SYSTEM WITH REFLECTING SECTIONS

BACKGROUND OF THE INVENTION

This invention relates to a deflection scanning optical system wherein a polygonal mirror or the like deflects a laser beam to cause the deflected laser beam to scan a surface to be scanned and, more particularly, to a mirror for use in the scanning optical system to direct the laser beam toward a detecting element for detecting a scanning position of the laser beam with respect to the surface to be scanned, in order to obtain a horizontal synchronizing signal.

Recently, various apparatuses have been developed which employ an optical system wherein a polygonal mirror deflects a laser beam to cause the deflected laser beam to scan a surface to be scanned. Such apparatuses include, for example, a laser beam printer wherein a laser beam is used to scan a surface of a photoconductive drum along an axis thereof to carry out a main scanning, and the photoconductive drum is rotated to carry out an auxiliary scanning In this laser beam printer, an electrophotographic system is utilized to carry out printing The above-described apparatuses also include a laser photo-plotter wherein a laser beam is used to scan a photosensitive material surface to draw a pattern on an original plate of a printed circuit board or the like. In such laser beam printer, laser photo-plotter or the like, it is desirable to reduce the size and weight of the entire apparatus as far as possible, from the viewpoint of installation space, manufacturing cost, operability and the like of the apparatus.

On the other hand, if it is supposed that the wavelength of a laser beam is constant, the larger a numerical aperture NA of a condenser lens, the more reduced in diameter can the beam waist be. In other words, if the focal length of the condenser lens is the same, the larger the diameter of the condenser lens, the more reduced in diameter can the beam waist be. In this manner, if the beam waist is reduced in diameter, an allowable depth is lengthened so that more precise drawing is made possible. In order to raise the NA, however, it is required to increase the diameter of the condenser lens or to shorten the focal length thereof. This results in such problems that the manufacturing cost of the lens increases and an aberration of the optical system increases. It is therefore desirable to lengthen the laser beam optical path, i.e., the focal length of the condenser lens as far as possible.

For the reasons discussed above, the laser beam optical path is refracted repeatedly in an attempt to secure the requisite optical path length and to reduce the size of the apparatus, thereby making the above requirements compatible with each other.

In addition, in the above-mentioned scanning optical system, in order to control the writing timing of the laser beam, a reflecting mirror for exclusive use in such controlling is arranged at a predetermined position on the scanning path. A detecting element or light receiving element is so arranged as to receive the laser beam reflected by the reflecting mirror for detecting passage of the laser beam, i.e., the scanning position of the laser beam, to thereby generate a signal serving as a horizontal synchronizing signal.

However, the above-described conventional arrangement requires a multiplicity of reflecting mirrors for refracting the laser beam optical path, causing an increase in the cost of the component parts. Further, since the reflecting mirrors must be installed with high accuracy, considerable time is required for assembling and adjustment of the reflecting mirrors, resulting in an increase of the manufacturing cost.

SUMMARY OF THE INVENTION

It is therefore an object of this invention to provide an improved deflection scanning optical system capable of reducing the number of component parts to facilitate assembling and adjustment of the component parts, thereby reducing the manufacturing cost.

For the above purpose, according to the invention, there is provided a deflection scanning optical system comprising:

a laser beam source emitting a laser beam toward a surface to be scanned;

a single first mirror arranged between the laser beam source and the surface to be scanned, the first mirror having a first reflecting section, a second reflecting section and a transparent section, the laser beam from the laser beam source being reflected by the first reflecting section;

a second mirror for reflecting the laser beam reflected by the first reflecting section of the first mirror, toward the second reflecting section of the first mirror, the second mirror also reflecting the laser beam reflected by the first reflecting section of the first mirror to transmit the reflected laser beam through the transparent section of the first mirror, thereby directing the transmitted laser beam toward the surface to be scanned; and detecting means receiving the laser beam reflected by the second mirror toward the second reflecting section of the first mirror and reflected by the second reflecting section, for detecting a scanning position of the laser beam with respect to the surface to be scanned.

Brief Description of the Accompanying Drawings

DETAILED DESCRIPTION

Figure 1:
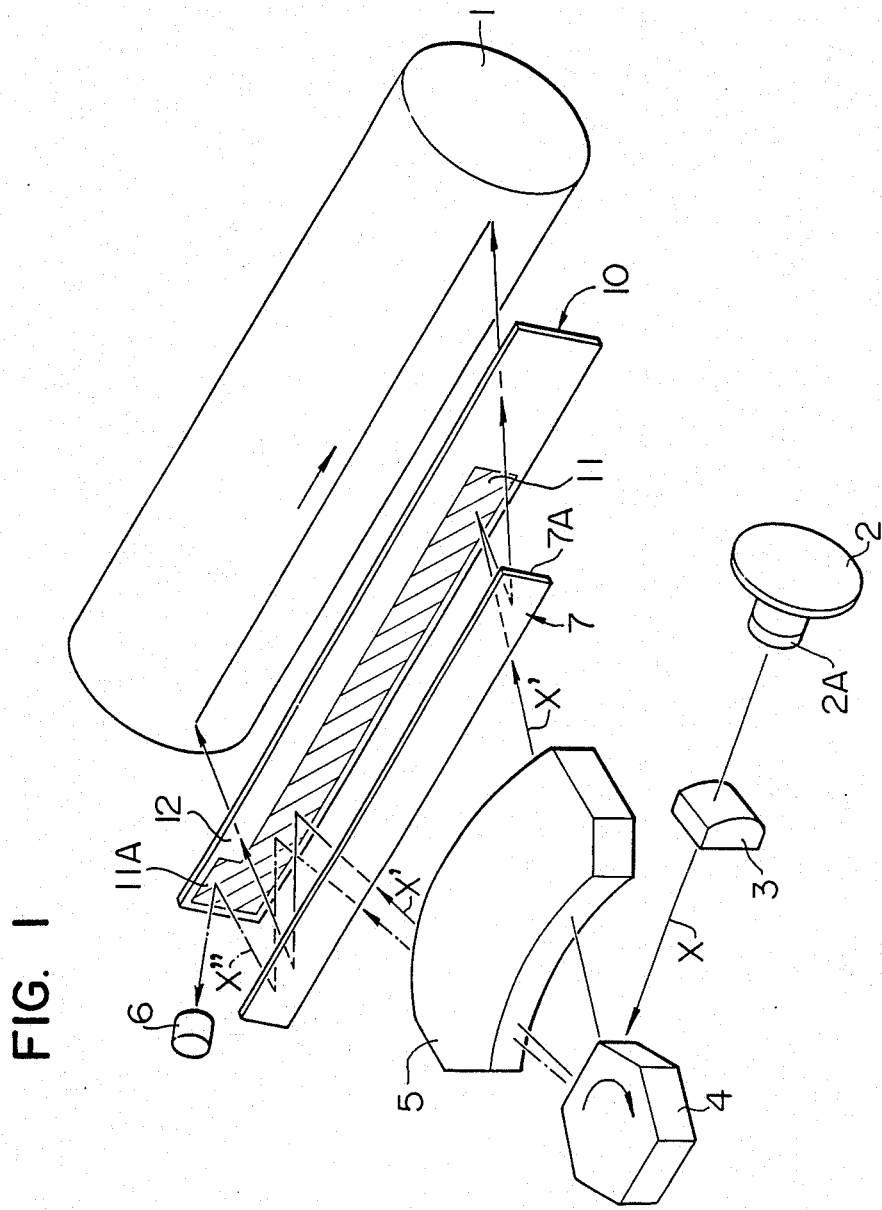
FIG. 1 is a diagrammatic perspective view of a deflection scanning optical system embodying the invention.

Referring to FIG. 1, there is illustrated a deflection scanning optical system embodying the invention, for use in a laser beam printing apparatus.

The laser beam printing apparatus is utilized as an external output device for a computer, an imaging device or the like. The printing apparatus employs an electrophotographic system wherein a laser beam X from a laser beam source such as, for example, a laser diode 2 scans a surface of a photoconductive drum 1 along an axis thereof to carry out a main scanning, and the charged photoconductive drum 1 is rotated about its axis to carry out an auxiliary scanning. Information resolved into dots is written onto the surface of the photoconductive drum 1 to form a latent image thereon. Toner is then applied to the latent image to develop the latent image. Subsequently, the developed image is transferred to a recording paper sheet to effect printing. In this manner, the laser beam printing apparatus outputs information from the computer, the imaging device or the like.

The arrangement of the deflection scanning optical system is such that a rotatable polygonal mirror 4 reflects the laser beam X from the laser diode 2, to cause the reflected laser beam X' to scan the surface of the photoconductive drum 1. The scanning optical system is composed of the laser diode 2, a collimating lens 2A mounted in a united fashion to the laser diode 2, a cylindrical lens 3, the polygonal mirror 4, an $f\theta$ lens 5, a light receiving element or detecting element 6, a first mirror 10 and a second mirror 7. These component parts of the scanning optical system are located in predetermined positional relation to each other.

Specifically, the laser diode 2 and the collimating lens 2A are arranged in facing relation to the polygonal mirror 4. The cylindrical lens 3 is arranged in an optical path of the laser beam X between the laser diode 2 and the polygonal mirror 4 such that an axis of the cylindrical lens 3 extends perpendicularly to a rotational axis of the polygonal mirror 3. The $f\theta$ lens 5, the second mirror 7 and the first mirror 10 are arranged in an optical path of the laser beam X' reflected by the polygonal mirror 4, that is, between the polygonal mirror 4 and the photoconductive drum 1. The detecting element 6 is arranged at a location adjacent and above longitudinal one end of the second mirror 7.

The first mirror 10 is in the form of an elongated rectangle and is formed of an optical glass having a predetermined thickness. The first mirror 10 has a length equal to or longer than a scanning range of the scanning laser beam X' at the position of the first mirror 10. A reflective coating is applied to a lower half of the first mirror 10 to form a first reflecting section 11 for reflecting the scanning laser beam X' to turn up the optical path thereof. An upper half of the first mirror 10 is formed into a transparent section 12 through which the scanning laser beam X' is transmitted. It will be appreciated that the first reflecting section 11 and the transparent section 12 are each in the form of an elongated rectangle and extend in parallel relation to each other. A reflective coating is applied also to a portion of the transparent section 12 adjacent longitudinal one end thereof, to form a second reflecting section 11A for reflecting a laser beam X" reflected by the first reflecting section 11 of the first mirror 10 and again reflected by the second mirror 7. The second reflecting section 11A is formed in continuous relation to the first reflecting section 11.

The second reflecting section 11A is formed at a location on the outside of the scanning range of the laser beam X' which scans the charged surface of the photoconductive drum 1. That is, the laser beam X" incident upon the second reflecting section 11A is located out of the scanning range for drawing a linear image on the charged surface of the photoconductive drum 1 to form a latent image thereon.

Figure 2:
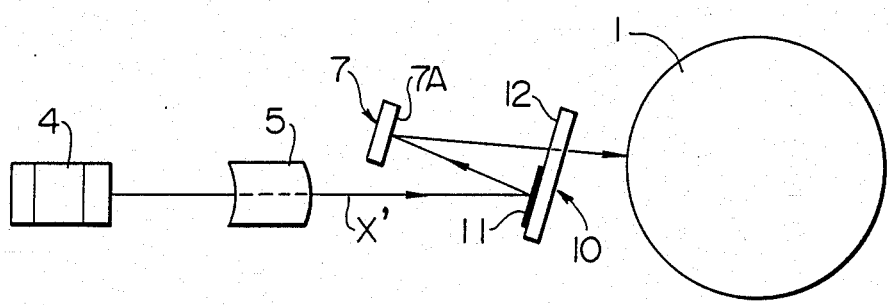
FIG. 2 is a diagrammatic side elevational view of the system illustrated in FIG. 1, showing an optical path of a scanning laser beam.

As clearly shown in FIG. 2, the first mirror 10 is arranged between the $f\theta$ lens 5 and the photoconductive drum 1 in such a fashion that the first reflecting section 11 is directed slightly upwardly toward the $f\theta$ lens 5, i.e., toward the incident direction of the scanning laser beam X'. The first reflecting section 11 extends in parallel relation to the scanning direction of the laser beam X', that is, the axis of the photoconductive drum 1.

The second mirror 7 is in the form of an elongated rectangle having one side which is entirely formed into a reflecting surface 7A. The second mirror 7 is arranged between the $f\theta$ lens 5 and the first mirror 10 and above the optical path of the scanning laser beam X' in such a fashion that the reflecting surface 7A is directed toward the first mirror 10 and extends along the longitudinal axis of the photoconductive drum 1.

The detecting element 6 is located at a predetermined position adjacent and above the longitudinal one end of the second mirror 7. That is, the detecting element 6 is arranged at a position where the laser beam X" from the $f\theta$ lens 5, reflected by the first reflecting section 11 of the first mirror 10, again reflected by the reflecting surface 7A of the second mirror 7, and further reflected by the second reflecting section 11A of the first mirror 10 is incident upon the detecting element 6 to detect a scanning position of the scanning laser beam X' with respect to the surface of the photoconductive drum 1.

The operation of the deflection scanning optical system constructed as above will be described below.

The laser beam X emitted from the laser diode 2 is brought to a collimated light ray by the collimating lens 2A. The laser beam X then passes through the cylindrical lens 3. The laser beam X having an oval sectional configuration is incident upon the polygonal mirror 4 such that the longitudinal axis of the oval sectional configuration perpendicularly crosses the rotational axis of the polygonal mirror 4.

The laser beam X is reflected and deflected by a plurality of reflecting faces of the polygonal mirror 4 rotating about its rotational axis, so that the laser beam X is brought to the scanning laser beam X'. The scanning laser beam X' is caused to pass through the $f\theta$ lens 5 for compensating a scanning speed with the scanning laser beam X' on the surface of the photoconductive drum 1 to a constant value and for shaping the sectional configuration of the scanning laser beam X'. The scanning laser beam X' from the $f\theta$ lens 5 is directed toward the first mirror 10.

The scanning laser beam X' from the $f\theta$ lens 5 is reflected by the first reflecting section 11 of the first mirror 10 toward the second mirror 7. The scanning laser beam X' toward the second mirror 7 is again reflected by the same. The scanning laser beam X' reflected by the second mirror 7 is transmitted through the transparent section 12 of the first mirror 10 and is directed toward the photoconductive drum 1, as shown in FIG. 2.

Figure 3:
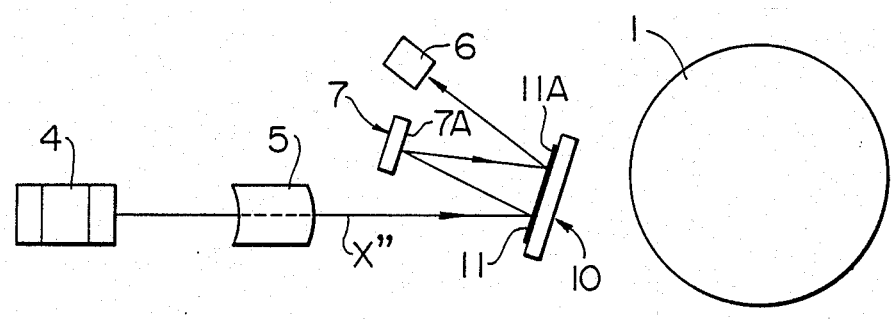
FIG. 3 is a view similar to FIG. 2, but showing an optical path of a laser beam toward a detecting element for detecting a scanning position of the laser beam.

The laser beam X" out of the scanning range, which does not scan the surface of the photoconductive drum 1, i.e., which does not form a latent image on the surface of the photoconductive drum 1, is reflected by the second reflecting section 11A of the first mirror 10 and is incident upon the detecting element 6, to thereby detect the scanning position of the scanning laser beam X', as shown in FIG. 3.

The scanning laser beam X' transmitted through the transparent section 12 of the first mirror 10 converges onto the charged surface of the photoconductive drum 1, and is horizontally synchronized on the bases of the scanning position of the laser beam X' detected by the detecting element 6. Thus, the scanning laser beam X' carries out the main scanning of the charged surface of the photoconductive drum 1 along the rotational axis thereof.

That is, the scanning laser beam X' carrying out the main scanning is incident upon the photoconductive drum 1 to scan the same, through the first reflecting section 11 of the first mirror 10 and the second mirror 7 so as to draw an optical path in the form of the inverted letter Z as viewed in side elevation, as shown in FIG. 2.

With the arrangement described above, a canning position detecting mirror, which has conventionally been provided independently as a separate component part, can be dispensed with.

In the above embodiment, it has been described that the optical path reflected by the first and second mirror 10 and 7 is in the form of the inverted letter Z. It is to be understood, however, that the configuration of the optical path may take any form. In addition, it is needless to say that the first reflecting section 11 and the transparent section 12 of the first mirror 10 may be inverse in their positional relationship, and the second reflecting section 11A may suitably be altered in position.

Usually, a dustproof glass is provided between the photoconductive drum 1 and the scanning optical system in order to prevent ingress of dust into the scanning optical system. A reflective coating may be applied to a predetermined area on the dustproof glass to form a mirror section which is utilized in substitution for the first mirror 10 in the above-described embodiment. By doing so, the number of component parts is further reduced, making it possible to reduce the manufacturing cost.

As described above, the arrangement of the deflection scanning optical system according to the invention is such that the single first mirror serves not only as a mirror for refracting the optical path of the scanning laser beam, but also as a mirror for reflecting the laser beam toward the detecting means for detecting the scanning position of the scanning laser beam. With such arrangement, the number of component parts is reduced to enable the expense of the component parts to be pared down and to enable assembly and adjustment of the component parts to be facilitated, thus making it possible to reduce the manufacturing cost.

What is claimed is:

1. A deflection scanning optical system comprising:
    a laser beam source emitting a laser beam toward a surface to be scanned;
    a single first mirror arranged between said laser beam source and said surface to be scanned, said first mirror having a first reflecting section, a second reflecting section and a transparent section, the laser beam from said laser beam source being reflected by said first reflecting section;
    a second mirror for reflecting the laser beam reflected by said first reflecting section of said first mirror, toward said second reflecting section of said first mirror, said second mirror also reflecting the laser beam reflected by said first reflecting section of said first mirror to transmit the reflected laser beam through said transparent section of said first mirror, thereby directing the transmitted laser beam toward said surface to be scanned; and
    detecting means receiving the laser beam reflected by said second mirror toward said second reflecting section of said first mirror and reflected by said second reflecting section, for detecting a scanning position of the laser beam with respect to said surface to be scanned.

2. The deflection scanning optical system according to claim 1, wherein said first reflecting section of said first mirror is in the form of an elongated rectangle, wherein said transparent section of said first mirror is in the form of an elongated rectangle extending in parallel relation to said first reflecting section, and wherein said second reflecting section is formed on a portion of said elongated transparent section adjacent longitudinal to one end thereof.

3. The deflection scanning optical system according to claim 2, wherein said second mirror is in the form of an elongated rectangle extending in parallel relation to said elongated first reflecting section of said first mirror.

4. The deflection scanning optical system according to claim 2, wherein said second reflecting section of said first mirror is provided in continuous relation to said first reflecting section.

5. The deflection scanning optical system according to claim 1, wherein said second reflecting section of said first mirror is located out of a scanning range of the laser beam at said first mirror.

6. The deflection scanning optical system according to claim 1, which further comprises deflecting means arranged between said laser beam source and said first mirror, for reflecting the laser beam from said laser beam source, toward said first mirror.

7. The deflection scanning optical system according to claim 6, wherein said deflecting means comprises a rotatable polygonal mirror.

8. The deflection scanning optical system according to claim 6, which further comprises an fθ lens arranged between said polygonal mirror and said first mirror, for compensating a scanning speed of the laser beam from said polygonal mirror toward said first mirror to a constant value and for shaping the laser beam toward said first mirror.

9. The deflection scanning optical system according to claim 2, wherein said surface to be scanned is a peripheral surface of a rotatable photoconductive drum having an axis parallel to said elongated first reflecting section of said first mirror.

* * * * *